(12) United States Patent
Gibson et al.

(10) Patent No.: US 10,957,114 B2
(45) Date of Patent: *Mar. 23, 2021

(54) VEHICULAR BACKUP ASSISTANCE SYSTEM

(71) Applicant: MAGNA ELECTRONICS INC., Auburn Hills, MI (US)

(72) Inventors: Joel S. Gibson, Linden, MI (US);
Steven V. Byrne, Goodrich, MI (US);
Richard D. Shriner, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,094

(22) Filed: Feb. 10, 2020

(65) Prior Publication Data

US 2020/0175773 A1     Jun. 4, 2020

Related U.S. Application Data

(63) Continuation of application No. 16/234,760, filed on Dec. 28, 2018, now Pat. No. 10,559,134, which is a
(Continued)

(51) Int. Cl.
*G06T 19/00* (2011.01)
*B60R 1/00* (2006.01)
*H04N 17/00* (2006.01)

(52) U.S. Cl.
CPC ............. *G06T 19/006* (2013.01); *B60R 1/00* (2013.01); *H04N 17/002* (2013.01); *B60R 2300/305* (2013.01); *B60R 2300/806* (2013.01)

(58) Field of Classification Search
CPC ........ G06T 19/006; B60R 1/00; H04N 17/002
See application file for complete search history.

(56) References Cited

U.S. PATENT DOCUMENTS

| 5,289,321 A | 2/1994 | Secor |
| 5,359,363 A | 10/1994 | Kuban et al. |

(Continued)

FOREIGN PATENT DOCUMENTS

| JP | 59114139 | 7/1984 |
| JP | 05133336 | 9/1984 |

(Continued)

OTHER PUBLICATIONS

Ballard, Dana H. et al., "Computer Vision", 1982, p. 88-89, sect. 3.4.1.

(Continued)

*Primary Examiner* — Sarah Lhymn
(74) *Attorney, Agent, or Firm* — Honigman LLP

(57) ABSTRACT

A vehicular backup assistance system includes a rear backup camera for a rear portion of any vehicle family member of a particular family of vehicles that includes a plurality of vehicle configurations, with each vehicle family member of the particular family of vehicles having a vehicle configuration that is different than the vehicle configuration of any other vehicle family member of the particular family of vehicles. A processor and a display are at a vehicle family member having the particular vehicle configuration of the particular family of vehicles. During a reversing maneuver, and based on the wheelbase of the particular vehicle configuration of the particular family of vehicles and based at least in part on a current steering angle of the vehicle family member, the processor generates a predicted vehicle trajectory that is displayed at the display as a dynamic overlay overlaying the images captured by the rear backup camera.

71 Claims, 6 Drawing Sheets

Related U.S. Application Data continuation of application No. 16/029,750, filed on Jul. 9, 2018, now Pat. No. 10,169,926, which is a continuation of application No. 14/117,759, filed as application No. PCT/US2011/036967 on May 18, 2011, now Pat. No. 10,019,841.

(56) References Cited

U.S. PATENT DOCUMENTS

| | | | |
|---|---|---|---|
| 5,410,346 | A | 4/1995 | Saneyoshi et al. |
| 5,414,461 | A | 5/1995 | Kishi et al. |
| 5,444,478 | A | 8/1995 | Lelong et al. |
| 5,574,443 | A | 11/1996 | Hsieh |
| 5,793,308 | A | 8/1998 | Rosinski et al. |
| 5,949,331 | A | 9/1999 | Schofield et al. |
| 6,155,377 | A | 12/2000 | Tokunaga et al. |
| 6,256,561 | B1 | 7/2001 | Asanuma |
| 6,578,017 | B1 | 6/2003 | Ebersole et al. |
| 6,631,994 | B2 | 10/2003 | Suzuki et al. |
| 7,295,227 | B1 | 11/2007 | Asahi et al. |
| 7,843,451 | B2 | 11/2010 | Lafon |
| 7,930,160 | B1 | 4/2011 | Hosagrahara et al. |
| 8,405,724 | B2 | 3/2013 | Jeon et al. |
| 8,451,107 | B2 | 5/2013 | Lu et al. |
| 10,019,841 | B2 | 7/2018 | Gibson et al. |
| 10,169,926 | B2 | 1/2019 | Gibson et al. |
| 10,559,134 | B2 | 2/2020 | Gibson et al. |
| 2002/0120371 | A1 | 8/2002 | Leivian et al. |
| 2002/0128754 | A1 | 9/2002 | Sakiyama et al. |
| 2006/0287826 | A1 | 12/2006 | Shimizu et al. |
| 2007/0038422 | A1 | 2/2007 | Wang et al. |
| 2007/0120657 | A1 | 5/2007 | Schofield et al. |
| 2007/0194899 | A1 | 8/2007 | Lipman |
| 2008/0129539 | A1 | 6/2008 | Kumon |
| 2008/0231701 | A1 | 9/2008 | Greenwood et al. |
| 2008/0266541 | A1 | 10/2008 | Yung et al. |
| 2008/0300745 | A1 | 12/2008 | Goossen et al. |
| 2009/0179916 | A1 | 7/2009 | Williams et al. |
| 2012/0316779 | A1 | 12/2012 | Kanno et al. |
| 2014/0032184 | A1 | 1/2014 | Carrasco et al. |

FOREIGN PATENT DOCUMENTS

| | | |
|---|---|---|
| JP | 6080953 | 5/1985 |
| JP | 6079889 | 10/1986 |
| JP | 6272245 | 5/1987 |
| JP | 62122487 | 6/1987 |
| JP | 6414700 | 1/1989 |
| JP | 04114587 | 4/1992 |
| JP | 0550883 | 3/1993 |
| JP | 0577657 | 3/1993 |
| JP | 5213113 | 8/1993 |
| JP | 06227318 | 8/1994 |
| JP | 074170 | 1/1995 |
| JP | 07105496 | 4/1995 |
| JP | 2630604 | 7/1997 |

OTHER PUBLICATIONS

International Search Report and Written Opinion dated Sep. 9, 2011 for PCT Application No. PCT/US2011/036967.

Tokumaru et al., "Car Rear-View TV System with CCD Camera," National Technical Report vol. 34, No. 3, pp. 329-336, Jun. 1988 (Japan).

Wang et al., CMOS Video Cameras, article, 1991, 4 pages, University of Edinburgh, UK.

"Edmunds", combined screen shots from http://www.edmunds.com/bmw/5-series/2010/features-specs.html?sub=sedan&style=101166700 (last visited Apr. 20, 2015) and http://web.archive.org/web/20110223063738*/http://www.edmunds.com/bmw/5-series/2010/features-specs.html (last visited Apr. 20, 2015) (Edmunds last saved Feb. 23, 2011).

Kannan, Saravanan et al., "An Intelligent Driver Assistance System (I-DAS) for Vehicle Safety Modelling Using Ontology Approach." International Journal of Ubicomp (IJU) vol. 1, No. 3 (Jul. 2010), pp. 15-29.

| OVERLAY MAP COUNT | WHEEL BASE (inch) STEERING GEAR OVERLAY RADIUS (mm) | 11a 100" 36a 1 SWA SWITCH (deg) | 11b 110" 36a 1 SWA SWITCH (deg) | 11c 120" 36a 1 SWA SWITCH (deg) | 11d 130" 36a 1 SWA SWITCH (deg) | 11c 120" 36b 2 SWA SWITCH (deg) | 11d 130" 36b 2 SWA SWITCH (deg) | 11e 140" 36b 2 SWA SWITCH (deg) |
|---|---|---|---|---|---|---|---|---|
| 22-1 | 42500 | 30 | 40 | 40 | 40 | 30 | 40 | 40 |
| 22-2 | 22500 | 110 | 120 | 130 | 140 | 110 | 120 | 120 |
| 22-3 | 15800 | 180 | 190 | 210 | 220 | 180 | 190 | 200 |
| 22-4 | 12400 | 240 | 250 | 270 | 300 | 240 | 260 | 270 |
| 22-5 | 10400 | 300 | 320 | 340 | 370 | 300 | 320 | 340 |
| 22-6 | 9000 | 360 | 380 | 410 | 430 | 350 | 380 | 390 |
| 22-7 | 8100 | 410 | 430 | 460 | 490 | 400 | 420 | 440 |
| 22-8 | 7400 | 450 | 470 | 500 | 540 | 440 | 470 | 490 |
| 22-9 | 6800 | 490 | 510 | 550 | 590 | 480 | 520 | 530 |
| 22-10 | 6400 | 530 | 550 | 600 | 640 | 520 | 550 | 570 |
| 22-11 | 6000 | 570 | 600 | 630 | 670 | 550 | 580 | 590 |
| 22-12 | 5700 | 600 | 630 | 660 | 690 | 570 | 600 | |
| 22-13 | 5400 | 630 | 650 | 680 | | 590 | | |
| 22-14 | 5200 | 650 | 670 | | | | | |
| 22-15 | 5100 | 670 | 690 | | | | | |
| 22-16 | 4900 | 690 | | | | | | |
| 22-17 | 4800 | 700 | | | | | | |

FIG. 6

VEHICULAR BACKUP ASSISTANCE SYSTEM

CROSS REFERENCE TO RELATED APPLICATIONS

The present application is a continuation of U.S. patent application Ser. No. 16/234,760, filed Dec. 28, 2018, now U.S. Pat. No. 10,559,134, which is a continuation of U.S. patent application Ser. No. 16/029,750, filed Jul. 9, 2018, now U.S. Pat. No. 10,169,926, which is a continuation of U.S. patent application Ser. No. 14/117,759, filed Nov. 14, 2013, now U.S. Pat. No. 10,019,841, which is a 371 national phase filing of PCT Application No. PCT/US2011/036967, filed May 18, 2011.

FIELD OF THE INVENTION

The present invention relates to vehicular cameras and more particularly to rearview vehicular cameras that display overlays onto the camera image.

BACKGROUND OF THE INVENTION

Vehicular cameras are used for a variety of purposes, such as to assist a driver in avoiding obstacles behind a vehicle when backing up. Some cameras add overlays onto the camera image to assist the driver in determining distances to obstacles behind the vehicle, vehicle trajectory and other useful information. The overlays may be static or may be dynamic. A dynamic overlay is an overlay that is changed by the camera based on certain inputs. For example, some cameras display a predicted vehicle trajectory based on certain factors such as steering wheel angle. The overlays, whether static or dynamic, will change depending on the angle of mounting of the camera, the height of the camera off the ground, distance from the camera horizontally to the rear axle of the vehicle, the steering gear ratio for the vehicle, and possibly other factors. As a result, cameras for different vehicles up until now have had different programming and thus have different part numbers associated with them. This results in a potentially large number of part numbers and inventory. A particular vehicle family, such as a particular truck, may have numerous vehicle configurations that will impact the overlays that are displayed by the rearview camera. Such configurations would include, for example, regular cab with short bed, regular cab with long bed, extended cab with short bed and extended cab with long bed.

It would be desirable to reduce the number of separate part numbers that are associated with variations on programming for essentially the same camera.

SUMMARY OF THE INVENTION

In one aspect, the invention is directed to a vehicular camera including a housing, a lens, an image sensor positioned for receiving images from the lens, a processor, and a memory. The memory contains a plurality of overlays. The processor is programmed to receive first input data from a vehicle in which the camera is to be mounted, wherein the first input data correspond to the configuration of the vehicle, and select a particular overlay to display based at least in part on the input received.

BRIEF DESCRIPTION OF THE DRAWINGS

The present invention will now be described by way of example only with reference to the attached drawings in which:

FIG. 6 is another lookup table that is used by an enhanced version of the camera to determine which overlay to use on an image.

DETAILED DESCRIPTION OF THE INVENTION

Figure 1:
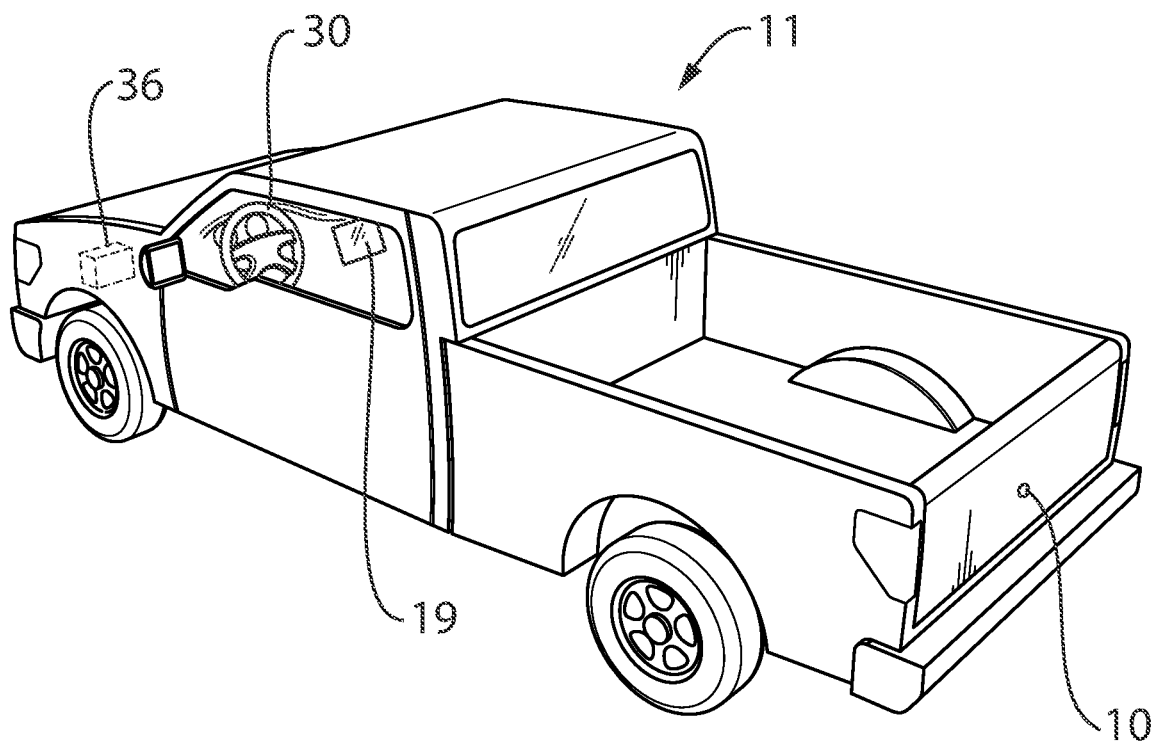
FIG. 1 is a perspective view of a vehicle with a vehicular camera in accordance with an embodiment of the present invention.
Figure 2:
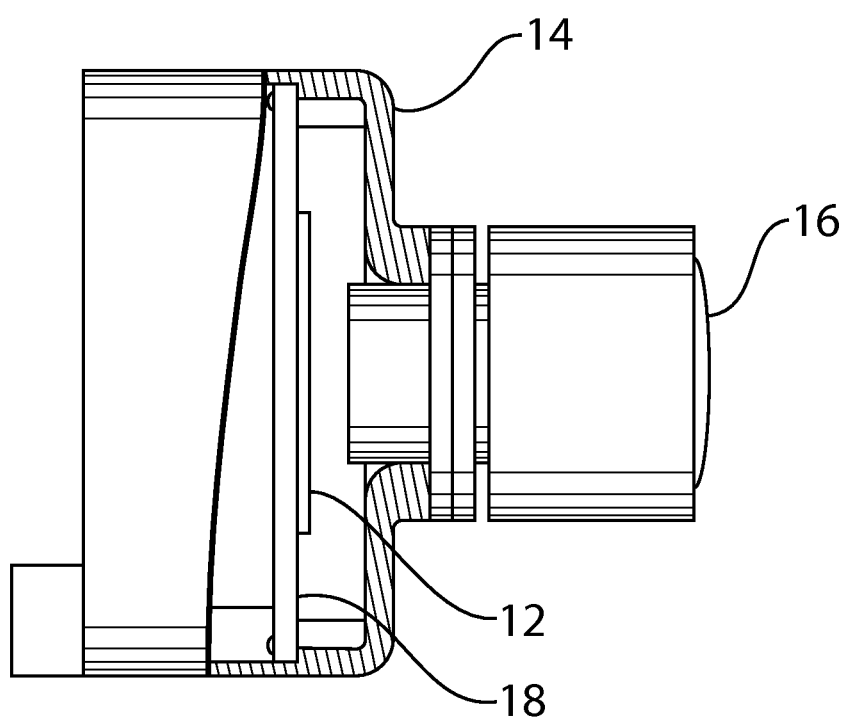
FIG. 2 is a cutaway side view of the vehicular camera shown in FIG. 1.
Figure 3:
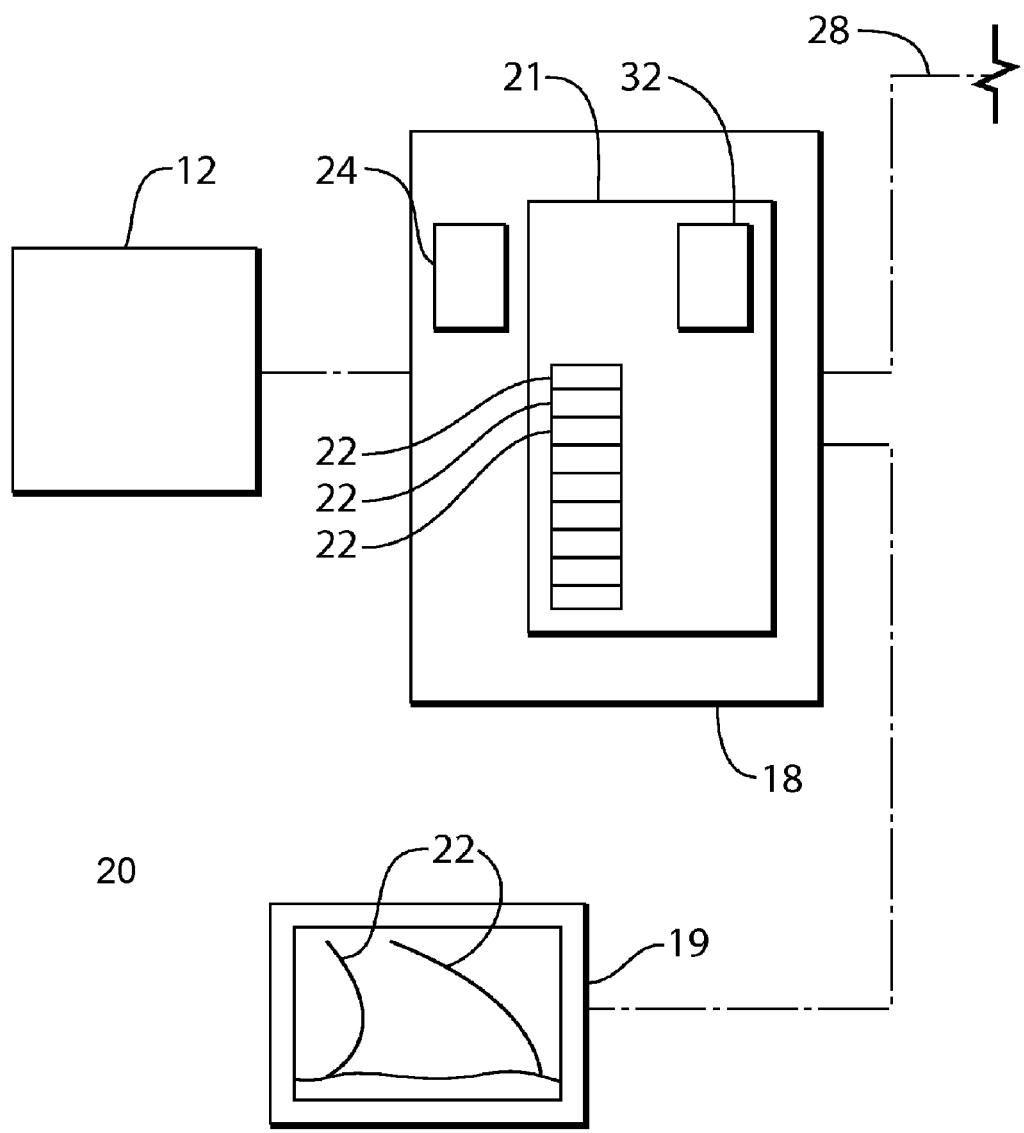
FIG. 3 is a schematic illustration of selected components from the camera shown in FIG. 1.
Figure 4:
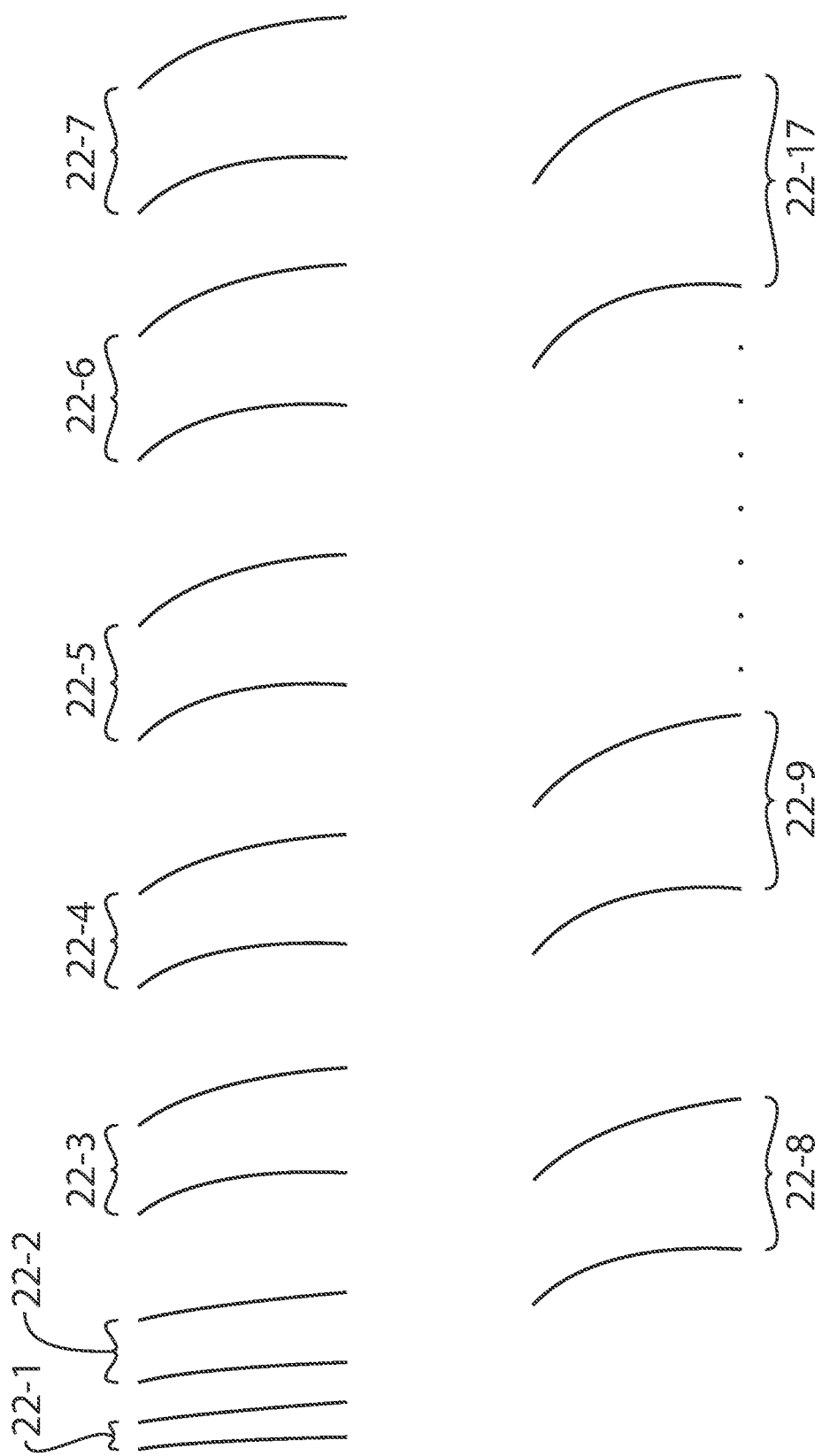
FIG. 4 is an illustration of selected overlays that are stored in a memory that is part of the camera shown in FIG. 1.

Reference is made to FIG. 1, which shows an exploded view of a vehicular camera 10 for a vehicle 11, in accordance with an embodiment of the present invention. In the embodiment shown, the camera 10 is a rearview camera that is configured to assist a vehicle driver when backing the vehicle up. Referring to FIG. 2, the vehicular camera 10 includes an image sensor 12 (e.g., a CCD or a CMOS sensor), a housing 14, a lens 16, and an image processing board 18. The lens 16 transmits and focuses images from behind the vehicle 11 onto the image sensor 12. Referring to FIG. 3, the image processing board 18 communicates with and receives images from the image sensor 12 and transmits the images to other vehicular devices, such as an in-cabin display 19. The images are shown at 20. Referring to FIG. 3, the image processing board 18 includes a memory 21 in which is stored a set of overlays 22-1, 22-2, 22-3, 22-4, 22-5, 22-6, 22-7, 22-8, 22-9 . . . 22-17 (FIG. 4) and a processor 24 (FIG. 3) which selects an overlay to add to the images 20 (FIG. 3) prior to sending the images to the in-cabin display 19.

The overlays 22-1, 22-2, 22-3, 22-4, 22-5, 22-6, 22-7, 22-8, 22-9 . . . 22-17 (FIG. 4) are dynamic overlays in the sense that the processor 24 selects different ones to apply to the image 20 depending on certain criteria. For example, in the example shown, the overlays 22-1, 22-2, 22-3, 22-4, 22-5, 22-6, 22-7, 22-8, 22-9 . . . 22-17 represent predicted vehicle trajectories based on certain data concerning the vehicle 11.

As shown in FIG. 3, the camera 10 receives input data from the vehicle 11 via a bus 28 (e.g., a LIN bus). The input data may include first input data which corresponds to the particular configuration of vehicle 11 the camera 10 is mounted to. For example, a particular vehicle family may include a range of vehicle configurations, covering vehicles with 4 different wheelbases. In this simplified example, other aspects of the vehicle configurations, such as the distance from the camera to the rear axle, are the same for each vehicle. The first input data would indicate to the camera 10 which of the 4 different vehicles the camera 10 is mounted to.

The input data may further include second input data which corresponds to the angle of the steering wheel in the vehicle 11. The steering wheel is shown at 30 in FIG. 1.

The processor 24 uses the first and second input data to identify which overlay 22 to use on the images 20. The processor 24 may achieve this in any suitable way. One such way is by using the first and second input data as input parameters for a lookup table shown at 32 that is stored in the memory 21.

Figure 5:
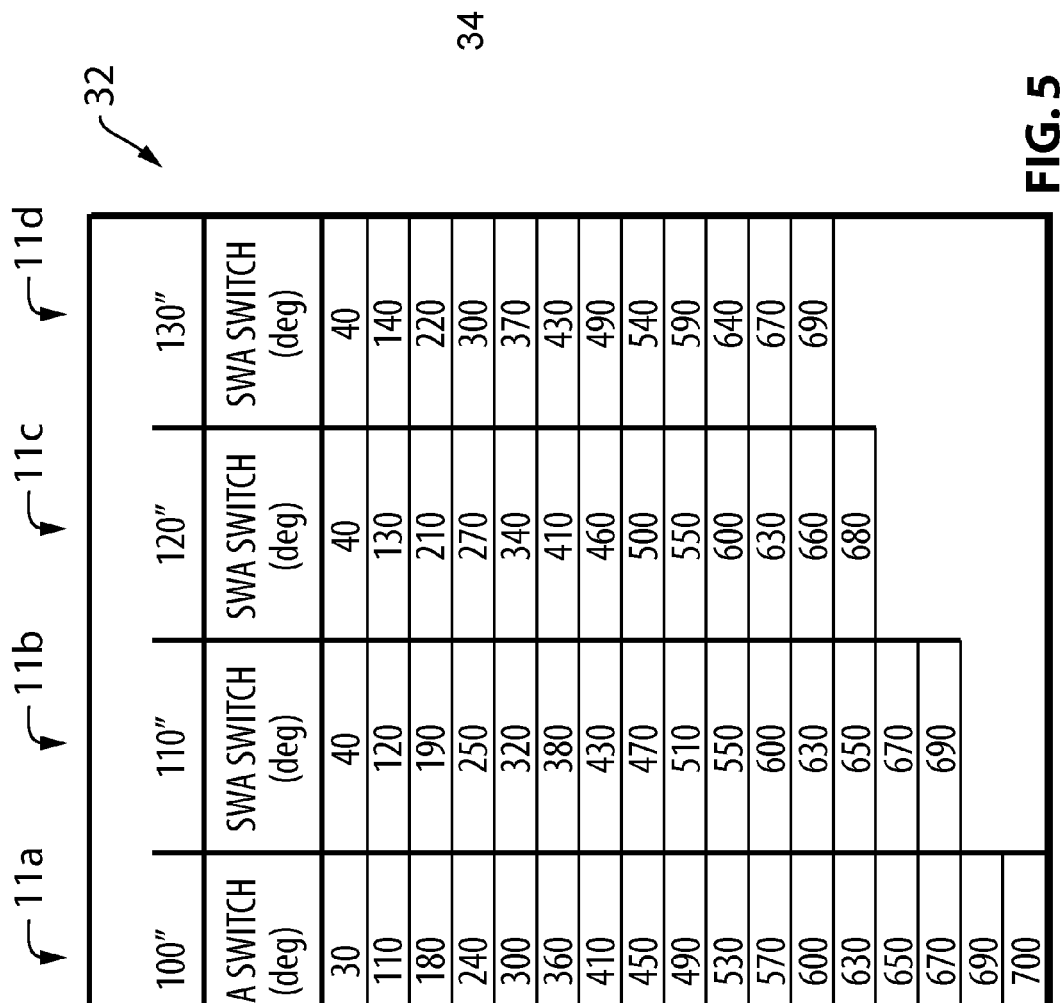
FIG. 5 is a lookup table that is used by the camera to determine which overlay to use on an image.

The lookup table 32 is shown in more detail in FIG. 5. As can be seen, and by way of example only, the aforementioned 4 different vehicle configurations are represented at 11*a*, 11*b*, 11*c* and 11*d*. A set of steering wheel angles are shown at 34 for each of the vehicle configurations 11*a*-11*d*. As can be seen, for vehicle configuration 11*a* (which has a wheelbase of 100"), if the second input data indicated a steering wheel angle of 240 degrees, the processor 24 would add the overlay shown at 22-4 in FIG. 4, to the image 20 (FIG. 3) prior to transmitting the image 20 with the overlay 22-4 to the in-cabin display 19. As another example, for vehicle configuration 11*c* (which has a wheelbase of 120"), if the second input data indicated a steering wheel angle of 460 degrees, the processor 24 would add the overlay shown at 22-7 in FIG. 4, to the image 20 (FIG. 3) prior to transmitting the image 20 with the overlay 22-7 to the in-cabin display 19.

It can be seen that the lookup table 32 does not require a substantial amount of the memory 21. Furthermore it can be seen that the total number of overlays 22 that needs to be stored in the memory 21 is no more than would need to be stored for the vehicle configuration 11*a*. It will be noted that for the 4 vehicle configurations shown in the lookup table 32, 13 of the overlays 22 (i.e., overlays 22-1 to 22-13 are common to all of the vehicle configurations, a further one overlay (22-14) is common to 3 of them, a further 2 overlays (22-15 and 22-16) are common to 2 of them, and only 2 overlays (22-17 and 22-18) are unique to one of them. Accordingly, the amount of memory consumed by providing the capability of handling 4 different vehicle configurations is not substantially more than the amount of memory already provided on such image processing boards when handling a single vehicle configuration. Additionally, the use of a lookup table is not computationally stressful for the processor 24.

However, it is alternatively possible that instead of a lookup table to determine which overlay 22 to use, the processor 24 could use the steering wheel angle data and the vehicle configuration data to calculate the projected vehicle trajectory and to then select an overlay 22 that is suitable. As another alternative, it is possible for the overlays to be mathematically generated by the processor 24 based on the steering wheel angle data and the vehicle configuration data. In other words, the processor 24 could, using the steering wheel angle data and the vehicle configuration data, calculate the curve on which to draw an overlay 22 instead of grabbing a premade overlay 22 from memory. In such an embodiment, the processor 24 could calculate an entirely new overlay each time it samples the steering wheel angle input, or it could calculate an adjustment to make to the previously drawn overlay each time it samples the steering wheel angle input. In either case, the processor 24 would be capable of drawing a continuous range of overlays 22 as compared to embodiments wherein a premade overlay 22 is pulled from memory and used over a range of steering wheel angles. In such an embodiment, the vehicle configuration data can be used to modify the formulas used by the processor 24 to determine the appropriate curve of the overlay 22. These modifications to the formulas (e.g., values for certain constants in the formulas) may be stored in an array or a lookup table stored in memory 21, and which is accessed by the processor 24 based on the vehicle configuration data. The aforementioned lookup table described above is the preferred approach, however.

It will be noted that, in part, many of the overlays 22 are common to the different vehicle configurations because the vehicle configurations are part of the same vehicle family. As such, many of the parameters that would impact the appearance of the overlays would be the same for all members of the vehicle family. Such parameters would include for example, the lateral distance of the camera from the edge of the vehicle, the height of the camera from the ground and the angle of the camera relative to horizontal.

Reference is made to FIG. 6, which shows a variant of the lookup table 32 that will be used to describe an enhancement to the embodiment shown in FIGS. 1-5. In some vehicle families it may be that the vehicle may be fitted with one of two different steering gear mechanisms each with its own gear ratio. The steering gear mechanism is shown in dashed outline at 36 in (FIG. 1). The two alternative steering gear mechanisms that could be used in the vehicle are shown at 36*a* and 36*b* in FIG. 6. As can be seen, the vehicle family shown in FIG. 6 includes 5 different vehicle configurations (shown at 11*a*-11*e* in FIG. 6), each with its own wheelbase. The first steering gear mechanism 36*a* can be used on 4 of the configurations. The second steering gear mechanism 36*b* can be used on 3 of the configurations.

In some cases the particular steering gear mechanism 36 used on the vehicle 11 may not be reflected in the vehicle configuration data (i.e., the first input data) that is transmitted to the camera 10. It will be understood of course that without knowing which steering gear mechanism (more particularly, which gear ratio) is used, the camera 10 does not have enough information based solely on the vehicle configuration and the steering wheel angle to determine the projected vehicle trajectory. In the particular exemplary case shown in FIG. 6, if the vehicle configuration data indicates that the vehicle is of type 11*a* or 11*b*, the processor 24 would have sufficient data because those configurations only use steering gear mechanism 36*a*. Similarly, if the vehicle configuration data indicates that the vehicle is of type 11*e*, the processor 24 would have sufficient data because those configurations only use steering gear mechanism 36*b*. However, if the vehicle configuration data indicates that the vehicle is of type 11*c* or 11*d*, the processor 24 would not have sufficient data because either steering gear mechanism 36*a* or 36*b* could be used with those configurations.

In order to determine which of the two steering gear mechanisms 36*a* or 36*b* is used on the vehicle 11, the camera 10 is activated and notified when the steering wheel 30 (FIG. 1) is turned to full lock. The second input data (i.e., the steering wheel angle data) is transmitted to the camera 10, and the processor 24 compares it to the maximum steering wheel angle shown in the lookup table 32 (FIG. 6) for that particular vehicle configuration. For example, for vehicle configuration 11*c*, if the steering wheel angle data (i.e., the second input data) sent to the camera 10 indicates 680 degrees of rotation, then the processor 24 can determine that the first steering gear mechanism 36*a* is being used on the vehicle 11. Alternatively, if the steering wheel angle data (i.e., the second input data) sent to the camera 10 indicates 590 degrees of rotation, then the processor 24 can determine that the first steering gear mechanism 36*b* is being used on the vehicle 11.

While the example overlays shown and described herein relate to the predicted vehicle trajectory, it will be understood that other overlays relating to other vehicle properties could be displayed. Additionally it will be understood that the overlays 22 shown and described may not be the only overlays shown on the images 20. Additionally dynamic and/or static overlays could also be shown on the images by the camera.

The processor 24 and memory 21 have been shown in FIG. 3 to be on an image processing board 18. The image sensor 12 may be attached directly to the board 18. It is alternatively possible for the processor 24 to reside on a separate board (not shown), which is distinct from the board to which the image sensor 12 is attached. In another alternative it is possible for the processor 24 to comprise a processor that is integral with the image sensor 12 and one that is separate from the image sensor 12. In such an alternative, both processors are collectively referred to as processor 24. In yet another alternative, it is possible for the processor 24 to comprise an external processor that is outside the housing 14 of the camera 10 that cooperates with one or more processors that are contained within the housing 14. In such an embodiment, such an external processor may be positioned anywhere within the vehicle.

Similarly, the memory 21 may alternatively reside on a board to which the image sensor 12 is integrally attached, or on a board that is separate from the board to which the image sensor 12 is attached. Alternatively the memory 21 may reside in part on the board to which the image sensor 12 is attached and in part on a board that is separate from the board to which the image sensor 12 is attached, in which case the two portions of the memory would collectively be referred to as the memory 21. In yet another alternative, it is possible for the memory 21 to comprise an external processor that is outside the housing 14 of the camera 10 that cooperates with one or more memories that are contained within the housing 14. In such an embodiment, such an external memory may be positioned anywhere within the vehicle.

While the above description constitutes a plurality of embodiments of the present invention, it will be appreciated that the present invention is susceptible to further modification and change without departing from the fair meaning of the accompanying claims.

The invention claimed is:

1. A vehicular backup assistance system, said vehicular backup assistance system comprising:
   a rear backup camera configured for mounting at a rear portion of a vehicle equipped with said vehicular backup assistance system, the equipped vehicle being a vehicle family member of a particular family of vehicles, the rear backup camera comprising a lens and an image sensor;
   wherein the particular family of vehicles comprises a plurality of vehicle configurations, and wherein the equipped vehicle has a particular vehicle configuration that is different than vehicle configurations of other vehicle family members of the particular family of vehicles;
   a processor disposed at the equipped vehicle;
   a display at the equipped vehicle, wherein the display is viewable by a driver executing a reversing maneuver of the equipped vehicle;
   wherein, with the rear backup camera mounted at the rear portion of the equipped vehicle, the rear backup camera has a field of view at least rearward of the equipped vehicle;
   wherein, with the rear backup camera mounted at the rear portion of the equipped vehicle and during the reversing maneuver, images captured by the rear backup camera are displayed at the display;
   wherein, with the rear backup camera mounted at the rear portion of the equipped vehicle, an input corresponding to the wheelbase of the particular vehicle configuration of the equipped vehicle is provided to the processor;
   wherein, with the rear backup camera mounted at the rear portion of the equipped vehicle and during the reversing maneuver, the processor receives inputs corresponding to current steering angles of the equipped vehicle;
   wherein, during the reversing maneuver, and based on the wheelbase of the particular vehicle configuration of the equipped vehicle and based at least in part on a current steering angle of the equipped vehicle, the processor generates a predicted vehicle trajectory;
   wherein the predicted vehicle trajectory comprises a pair of guidelines that are spaced apart and curved appropriate to (i) the wheelbase of the particular vehicle configuration of the equipped vehicle and (ii) the current steering angle of the equipped vehicle; and
   wherein, during the reversing maneuver, the predicted vehicle trajectory is displayed at the display as a dynamic overlay overlaying the images captured by the rear backup camera.

2. A driver backup assistance system as claimed in claim 1, wherein the processor is provided with the input corresponding to the wheelbase of the particular vehicle configuration of the equipped vehicle via a bus communication carried over a vehicular communication bus of the equipped vehicle.

3. A driver backup assistance system as claimed in claim 2, wherein, with the rear backup camera mounted at the rear portion of the equipped vehicle and responsive to the rear backup camera being operated at the equipped vehicle, the processor is provided with the input corresponding to the wheelbase of the particular vehicle configuration of the equipped vehicle.

4. A driver backup assistance system as claimed in claim 3, wherein the processor receives, via a bus communication carried over a vehicular communication bus of the equipped vehicle, the inputs corresponding to current steering angles of the equipped vehicle.

5. A driver backup assistance system as claimed in claim 4, wherein the rear backup camera comprises the processor.

6. A driver backup assistance system as claimed in claim 5, wherein the rear backup camera comprises memory storing a plurality of stored overlays.

7. A driver backup assistance system as claimed in claim 6, wherein the plurality of stored overlays stored in the memory includes a set of overlays corresponding to the particular vehicle configuration of the equipped vehicle and other sets of overlays corresponding to other vehicle configurations of other vehicle family members the particular family of vehicles.

8. A driver backup assistance system as claimed in claim 4, wherein the processor is disposed at the rear backup camera.

9. A driver backup assistance system as claimed in claim 4, wherein, during the reversing maneuver, and based on the wheelbase of the particular vehicle configuration of the equipped vehicle and based at least in part on the current steering angle of the equipped vehicle, the processor generates the predicted vehicle trajectory using a mathematical formula.

10. A driver backup assistance system as claimed in claim 1, wherein, during the reversing maneuver, and based on the wheelbase of the particular vehicle configuration of the equipped vehicle and based at least in part on the current steering angle of the equipped vehicle, the processor generates the predicted vehicle trajectory using a mathematical formula.

11. A driver backup assistance system as claimed in claim 10, wherein, during the reversing maneuver, the dynamic overlay overlaying the images captured by the rear backup camera comprises a continuous range of overlays as steering angle changes.

12. A driver backup assistance system as claimed in claim 1, wherein the particular family of vehicles comprises a particular family of pickup trucks.

13. A driver backup assistance system as claimed in claim 12, wherein at least one pickup truck configuration of the particular family of pickup trucks comprises a regular cab pickup truck configuration.

14. A driver backup assistance system as claimed in claim 12, wherein at least one pickup truck configuration of the particular family of pickup trucks comprises an extended cab pickup truck configuration.

15. A driver backup assistance system as claimed in claim 12, wherein at least one pickup truck configuration of the particular family of pickup trucks comprises a short bed pickup truck configuration.

16. A driver backup assistance system as claimed in claim 12, wherein at least one pickup truck configuration of the particular family of pickup trucks comprises a long bed pickup truck configuration.

17. A driver backup assistance system as claimed in claim 12, wherein one pickup truck configuration of the particular family of pickup trucks comprises a short bed regular cab pickup truck configuration, and wherein another pickup truck configuration of the particular family of pickup trucks comprises a long bed regular cab pickup truck configuration.

18. A driver backup assistance system as claimed in claim 17, wherein another pickup truck configuration of the particular family of pickup trucks comprises a short bed extended cab pickup truck configuration, and wherein another pickup truck configuration of the particular family of pickup trucks comprises a long bed extended cab pickup truck configuration.

19. A driver backup assistance system as claimed in claim 12, wherein the particular family of pickup trucks comprises (i) a short bed regular cab pickup truck configuration, (ii) a long bed regular cab pickup truck configuration, (iii) a short bed extended cab pickup truck configuration and (iv) a long bed extended cab pickup truck configuration.

20. A driver backup assistance system as claimed in claim 1, wherein the particular vehicle configuration of the equipped vehicle has a wheelbase of at least 100 inches.

21. A driver backup assistance system as claimed in claim 1, wherein the particular vehicle configuration of the equipped vehicle has a wheelbase of at least 110 inches.

22. A driver backup assistance system as claimed in claim 1, wherein the particular vehicle configuration of the equipped vehicle has a wheelbase of at least 120 inches.

23. A driver backup assistance system as claimed in claim 1, wherein the particular vehicle configuration of the equipped vehicle has a wheelbase of at least 130 inches.

24. A driver backup assistance system as claimed in claim 1, wherein the particular vehicle configuration of the equipped vehicle has a wheelbase of at least 140 inches.

25. A driver backup assistance system as claimed in claim 1, wherein the particular family of vehicles comprises vehicle family members having a plurality of steering wheel ratios, and wherein the processor at the equipped vehicle is provided with an input indicative of the steering wheel ratio of the equipped vehicle.

26. A driver backup assistance system as claimed in claim 25, wherein the steering wheel ratio of the equipped vehicle is determined when steering of the equipped vehicle is at full lock.

27. A driver backup assistance system as claimed in claim 1, wherein the particular vehicle configuration of the equipped vehicle comprises a particular pickup truck configuration that is one of a particular family of four pickup trucks.

28. A driver backup assistance system as claimed in claim 27, wherein the particular pickup truck configuration of the equipped vehicle has a wheelbase of at least 110 inches.

29. A driver backup assistance system as claimed in claim 27, wherein the particular pickup truck configuration of the equipped vehicle has a wheelbase of at least 120 inches.

30. A driver backup assistance system as claimed in claim 27, wherein the particular pickup truck configuration of the equipped vehicle has a wheelbase of at least 130 inches.

31. A driver backup assistance system as claimed in claim 27, wherein the particular pickup truck configuration of the equipped vehicle has a wheelbase of at least 140 inches.

32. A driver backup assistance system as claimed in claim 27, wherein the particular pickup truck configuration of the equipped vehicle has a wheelbase of at least 110 inches and less than 140 inches.

33. A driver backup assistance system as claimed in claim 1, wherein the rear backup camera is configured for mounting at the rear portion of any vehicle family member of the particular family of vehicles.

34. A driver backup assistance system as claimed in claim 1, wherein, responsive to the rear backup camera being mounted at the rear portion of the equipped vehicle and responsive to the rear backup camera being operated at the equipped vehicle, the processor is provided with the input corresponding to the wheelbase of the particular vehicle configuration of the equipped vehicle.

35. A driver backup assistance system as claimed in claim 1, wherein the processor is disposed at an image processing board.

36. A driver backup assistance system as claimed in claim 35, wherein the rear backup camera comprises memory storing a plurality of stored overlays, and wherein the memory storing the plurality of stored overlays is disposed at the image processing board.

37. A driver backup assistance system as claimed in claim 36, wherein the plurality of stored overlays stored in the memory includes a set of overlays corresponding to the particular vehicle configuration of the equipped vehicle and other sets of overlays corresponding to other vehicle configurations of the particular family of vehicles.

38. A driver backup assistance system as claimed in claim 37, wherein the image processing board is disposed at the rear backup camera.

39. A vehicular backup assistance system, said vehicular backup assistance system comprising:
   a rear backup camera configured for mounting at a rear portion of a vehicle equipped with said vehicular backup assistance system, the equipped vehicle being a vehicle family member of a particular family of vehicles, the rear backup camera comprising a lens and an image sensor;
   wherein the particular family of vehicles comprises a plurality of vehicle configurations, and wherein the equipped vehicle has a particular vehicle configuration that is different than vehicle configurations of other vehicle family members of the particular family of vehicles;
   a processor disposed at the equipped;
   wherein the vehicle configurations of the particular family of vehicles comprise (i) a short bed regular cab pickup truck configuration, (ii) a long bed regular cab pickup truck configuration, (iii) a short bed extended cab pickup truck configuration and (iv) a long bed extended cab pickup truck configuration;

a display at the equipped vehicle, wherein the display is viewable by a driver executing a reversing maneuver of the equipped vehicle;

wherein, with the rear backup camera mounted at the rear portion of the equipped vehicle, the rear backup camera has a field of view at least rearward of the equipped vehicle;

wherein, with the rear backup camera mounted at the rear portion of the equipped vehicle and during the reversing maneuver, images captured by the rear backup camera are displayed at the display;

wherein the particular vehicle configuration of the equipped vehicle has a wheelbase of at least 110 inches;

wherein the rear backup camera is configured for mounting at the rear portion of any vehicle family member of the particular family of vehicles;

wherein, with the rear backup camera mounted at the rear portion of the equipped vehicle, an input corresponding to the wheelbase of the particular vehicle configuration of the equipped vehicle is provided to the processor;

wherein, with the rear backup camera mounted at the rear portion of the equipped vehicle and during the reversing maneuver, the processor receives inputs corresponding to current steering angles of the equipped vehicle;

wherein, during the reversing maneuver, and based on the wheelbase of the particular vehicle configuration of the equipped vehicle and based at least in part on a current steering angle of the equipped vehicle, the processor generates a predicted vehicle trajectory;

wherein the predicted vehicle trajectory comprises a pair of guidelines that are spaced apart and curved appropriate to (i) the wheelbase of the particular vehicle configuration of the equipped vehicle and (ii) the current steering angle of the equipped vehicle; and wherein, during the reversing maneuver, the predicted vehicle trajectory is displayed at the display as a dynamic overlay overlaying the images captured by the rear backup camera.

40. A driver backup assistance system as claimed in claim 39, wherein the processor is disposed at an image processing board.

41. A driver backup assistance system as claimed in claim 40, wherein, during the reversing maneuver, and based on the wheelbase of the particular vehicle configuration of the equipped vehicle and based at least in part on the current steering angle of the equipped vehicle, the processor generates the predicted vehicle trajectory using a mathematical formula.

42. A driver backup assistance system as claimed in claim 41, wherein, during the reversing maneuver, the dynamic overlay overlaying the images captured by the rear backup camera comprises a continuous range of overlays as steering angle changes.

43. A driver backup assistance system as claimed in claim 40, wherein the particular vehicle configuration of the equipped vehicle has a wheelbase of at least 120 inches.

44. A driver backup assistance system as claimed in claim 40, wherein the particular vehicle configuration of the equipped vehicle has a wheelbase of at least 130 inches.

45. A driver backup assistance system as claimed in claim 40, wherein the particular vehicle configuration of the equipped vehicle has a wheelbase of at least 120 inches and less than 140 inches.

46. A driver backup assistance system as claimed in claim 39, wherein, responsive to the rear backup camera being mounted at the rear portion of the equipped vehicle and responsive to the rear backup camera being operated at the equipped vehicle, the processor is provided with the input corresponding to the wheelbase of the particular vehicle configuration of the equipped vehicle.

47. A driver backup assistance system as claimed in claim 46, wherein the processor is disposed at an image processing board.

48. A driver backup assistance system as claimed in claim 47, wherein memory storing a plurality of stored overlays is disposed at the image processing board, and wherein the plurality of stored overlays stored in the memory includes a set of overlays corresponding to the particular vehicle configuration of the equipped vehicle and other sets of overlays corresponding to other vehicle configurations of the particular family of vehicles.

49. A driver backup assistance system as claimed in claim 48, wherein the image processing board is disposed at the rear backup camera.

50. A driver backup assistance system as claimed in claim 39, wherein the processor is disposed at an image processing board, and wherein the rear backup camera comprises memory storing a plurality of stored overlays.

51. A driver backup assistance system as claimed in claim 50, wherein the image processing board is disposed at the rear backup camera.

52. A driver backup assistance system as claimed in claim 39, wherein the processor is provided with the input corresponding to the wheelbase of the particular vehicle configuration of the equipped vehicle via a bus communication carried over a vehicular communication bus of the equipped vehicle.

53. A driver backup assistance system as claimed in claim 52, wherein, responsive to the rear backup camera being mounted at the rear portion of the equipped vehicle and responsive to the rear backup camera being operated at the equipped vehicle, the processor is provided with the input corresponding to the wheelbase of the particular vehicle configuration of the equipped vehicle.

54. A driver backup assistance system as claimed in claim 39, wherein the processor receives, via a bus communication carried over a vehicular communication bus of the equipped vehicle, the inputs corresponding to current steering angles of the equipped vehicle.

55. A vehicular backup assistance system, said vehicular backup assistance system comprising:

a rear backup camera configured for mounting at a rear portion of a vehicle equipped with said vehicular backup assistance system, the equipped vehicle being a vehicle family member of a particular family of vehicles, the rear backup camera comprising a lens and an image sensor;

wherein the particular family of vehicles comprises a particular family of pickup trucks;

wherein the particular family of pickup trucks comprises a plurality of pickup truck configurations, and wherein the equipped vehicle has a particular pickup truck configuration that is different than pickup truck configurations of other pickup truck family members of the particular family of pickup trucks;

a processor disposed at the equipped vehicle;

wherein the processor is disposed at an image processing board;

a display at the equipped vehicle, wherein the display is viewable by a driver executing a reversing maneuver of the equipped vehicle;

wherein, with the rear backup camera mounted at the rear portion of the equipped vehicle, the rear backup camera has a field of view at least rearward of the equipped vehicle;

wherein, with the rear backup camera mounted at the rear portion of the equipped vehicle and during the reversing maneuver, images captured by the rear backup camera are displayed at the display;

wherein the particular pickup truck configuration of the equipped vehicle has a wheelbase of at least 110 inches;

wherein, with the rear backup camera mounted at the rear portion of the equipped vehicle, an input corresponding to the wheelbase of the particular pickup truck configuration of the equipped vehicle is provided to the processor;

wherein, with the rear backup camera mounted at the rear portion of the equipped vehicle and during the reversing maneuver, the processor receives inputs corresponding to current steering angles of the equipped vehicle;

wherein, during the reversing maneuver, and based on the wheelbase of the particular pickup truck configuration of the equipped vehicle and based at least in part on a current steering angle of the equipped vehicle, the processor generates a predicted vehicle trajectory;

wherein the predicted vehicle trajectory comprises a pair of guidelines that are spaced apart and curved appropriate to (i) the wheelbase of the particular pickup truck configuration of the equipped vehicle and (ii) the current steering angle of the equipped vehicle; and wherein, during the reversing maneuver, the predicted vehicle trajectory is displayed at the display as a dynamic overlay overlaying the images captured by the rear backup camera.

56. A driver backup assistance system as claimed in claim 55, wherein the rear backup camera is configured for mounting at the rear portion of any pickup truck family member of the particular family of pickup trucks.

57. A driver backup assistance system as claimed in claim 55, wherein one pickup truck configuration of the particular family of pickup trucks comprises a short bed regular cab pickup truck configuration, and wherein another pickup truck configuration of the particular family of pickup trucks comprises a long bed regular cab pickup truck configuration.

58. A driver backup assistance system as claimed in claim 57, wherein the pickup truck configuration of the particular family of pickup trucks comprising the short bed regular cab pickup truck configuration has a wheelbase of at least 110 inches, and wherein the pickup truck configuration of the particular family of pickup trucks comprising the long bed regular cab pickup truck configuration has a wheelbase of at least 130 inches.

59. A driver backup assistance system as claimed in claim 55, wherein one pickup truck configuration of the particular family of pickup trucks comprises a short bed extended cab pickup truck configuration, and wherein another pickup truck configuration of the particular family of pickup trucks comprises a long bed extended cab pickup truck configuration.

60. A driver backup assistance system as claimed in claim 59, wherein the pickup truck configuration of the particular family of pickup trucks comprising the short bed extended cab pickup truck configuration has a wheelbase of at least 120 inches, and wherein the pickup truck configuration of the particular family of pickup trucks comprising the long bed extended cab pickup truck configuration has a wheelbase of at least 140 inches.

61. A driver backup assistance system as claimed in claim 55, wherein, responsive to the rear backup camera being mounted at the rear portion of the equipped vehicle and responsive to the rear backup camera being operated at the equipped vehicle, the processor is provided with the input corresponding to the wheelbase of the particular pickup truck configuration of the equipped vehicle.

62. A driver backup assistance system as claimed in claim 61, wherein, during the reversing maneuver, and based on the wheelbase of the particular pickup truck configuration of the equipped vehicle and based at least in part on the current steering angle of the equipped vehicle, the processor generates the predicted vehicle trajectory using a mathematical formula.

63. A driver backup assistance system as claimed in claim 62, wherein, during the reversing maneuver, the dynamic overlay overlaying the images captured by the rear backup camera comprises a continuous range of overlays as steering angle changes.

64. A driver backup assistance system as claimed in claim 55, wherein the plurality of pickup truck configurations of the particular family of pickup trucks comprises (i) a short bed regular cab pickup truck configuration, (ii) a long bed regular cab pickup truck configuration, (iii) a short bed extended cab pickup truck configuration and (iv) a long bed extended cab pickup truck configuration.

65. A driver backup assistance system as claimed in claim 64, wherein the image processing board is disposed at the rear backup camera.

66. A driver backup assistance system as claimed in claim 55, wherein the processor receives, via a bus communication carried over a vehicular communication bus of the equipped vehicle, the inputs corresponding to current steering angles of the equipped vehicle.

67. A driver backup assistance system as claimed in claim 66, wherein the processor is provided with the input corresponding to the wheelbase of the particular pickup truck configuration of the equipped vehicle via a bus communication carried over a vehicular communication bus of the equipped vehicle.

68. A driver backup assistance system as claimed in claim 67, wherein, responsive to the rear backup camera being mounted at the rear portion of the equipped vehicle and responsive to the rear backup camera being operated at the equipped vehicle, the processor is provided with the input corresponding to the wheelbase of the equipped vehicle.

69. A driver backup assistance system as claimed in claim 55, wherein memory storing a plurality of stored overlays is disposed at the image processing board, and wherein the memory stores the plurality of stored overlays.

70. A driver backup assistance system as claimed in claim 69, wherein the plurality of stored overlays stored in the memory includes a set of overlays corresponding to the particular pickup truck configuration of the equipped vehicle and other sets of overlays corresponding to other pickup truck configurations of the particular family of pickup trucks.

71. A driver backup assistance system as claimed in claim 70, wherein the image processing board is disposed at the rear backup camera.

* * * * *

UNITED STATES PATENT AND TRADEMARK OFFICE
CERTIFICATE OF CORRECTION

PATENT NO. : 10,957,114 B2
APPLICATION NO. : 16/786094
DATED : March 23, 2021
INVENTOR(S) : Joel S. Gibson et al.

Page 1 of 1

It is certified that error appears in the above-identified patent and that said Letters Patent is hereby corrected as shown below:

In the Claims

Column 8
Claim 39, Line 64, "equipped;" should be --equipped vehicle;--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*